United States Patent
Li

(10) Patent No.: US 8,175,557 B2
(45) Date of Patent: *May 8, 2012

(54) PROCESSING RECEIVED DIGITAL DATA SIGNALS BASED ON A RECEIVED DIGITAL DATA FORMAT

(75) Inventor: Weidong Li, Los Gatos, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/893,237

(22) Filed: Sep. 29, 2010

(65) Prior Publication Data

US 2011/0019786 A1     Jan. 27, 2011

Related U.S. Application Data

(63) Continuation of application No. 12/267,393, filed on Nov. 7, 2008, now Pat. No. 7,831,228, which is a continuation of application No. 11/298,431, filed on Dec. 9, 2005, now Pat. No. 7,463,871.

(51) Int. Cl.
*H04B 7/08* (2006.01)
*H04B 1/10* (2006.01)
*H04B 1/16* (2006.01)

(52) U.S. Cl. ........ 455/130; 455/140; 455/307; 455/339; 375/147; 375/343

(58) Field of Classification Search .......... 455/132–140, 455/182.2, 183.2, 232.1, 234.1–234.2, 307, 455/333, 337, 339; 375/147–152, 340–343
See application file for complete search history.

(56) References Cited

U.S. PATENT DOCUMENTS

| | | | | |
|---|---|---|---|---|
| 5,784,419 A | * | 7/1998 | LaRosa et al. | 375/350 |
| 5,892,833 A | * | 4/1999 | Maag et al. | 381/98 |
| 7,058,144 B2 | * | 6/2006 | Baldwin | 375/346 |
| 7,177,622 B2 | * | 2/2007 | Oiwa et al. | 455/340 |
| 7,187,940 B2 | * | 3/2007 | Kelley | 455/501 |
| 7,215,272 B2 | * | 5/2007 | Lee | 341/152 |
| 7,463,871 B2 | * | 12/2008 | Li | 455/130 |
| 7,672,403 B2 | * | 3/2010 | May et al. | 375/316 |
| 7,831,228 B2 | * | 11/2010 | Li | 455/130 |
| 2005/0118977 A1 | * | 6/2005 | Drogi et al. | 455/323 |
| 2005/0272400 A1 | * | 12/2005 | Chen et al. | 455/337 |

* cited by examiner

*Primary Examiner* — Simon Nguyen
(74) *Attorney, Agent, or Firm* — Garlick & Markison; Kevin L. Smith

(57) ABSTRACT

An integrated circuit radio receiver includes radio frequency ("RF") front-end circuitry to receive a wireless signal and to produce digital data. The integrated circuit radio receiver includes a baseband processor is operable to process the digital data, in which the baseband processor is operable to produce a format designation based on the digital data. The baseband processor includes a plurality of digital filtering logic in which each of the digital filtering logic includes a level of digital filtering. The baseband processor further includes logic operable to select between each digital filtering logic of the plurality of digital filtering logic based upon the format designation, and to process the digital data with the selected level of digital filtering.

20 Claims, 10 Drawing Sheets

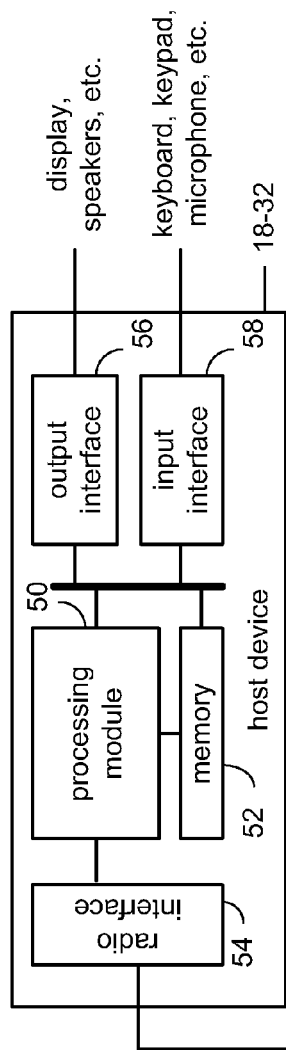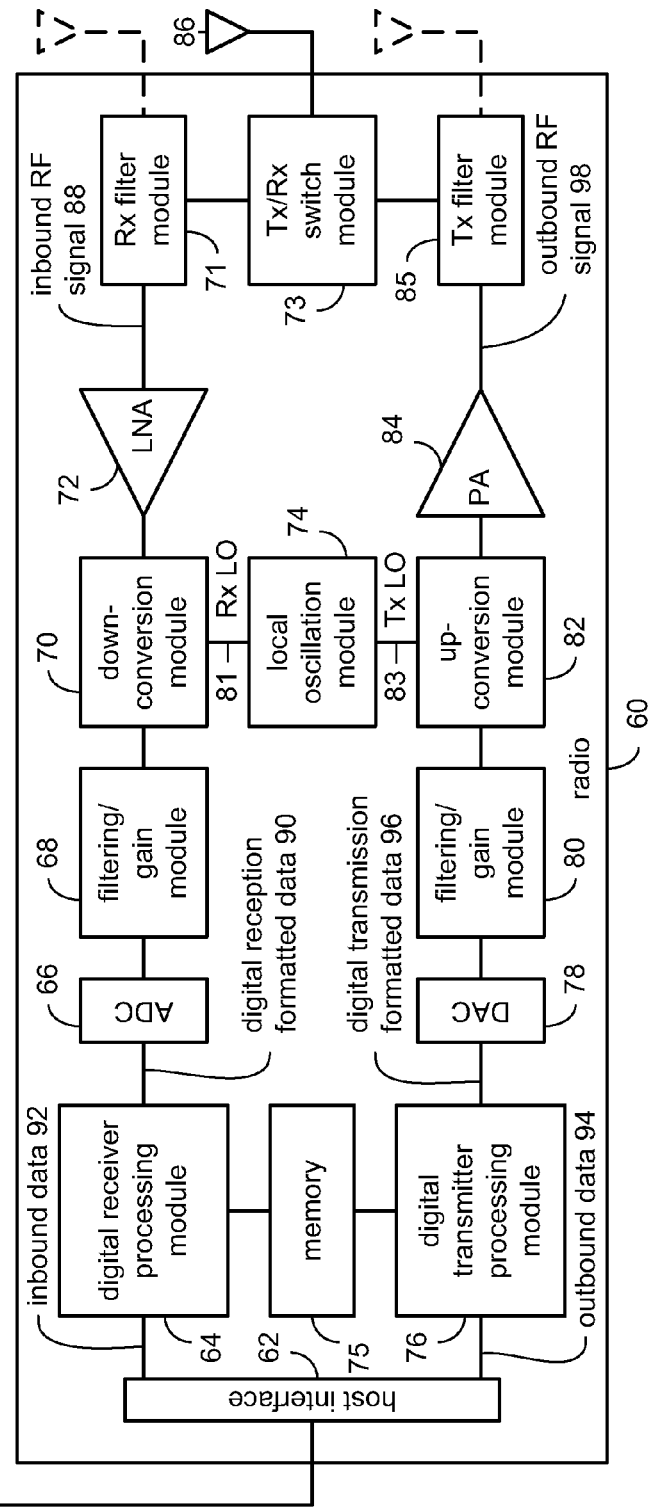
FIG. 2

PROCESSING RECEIVED DIGITAL DATA SIGNALS BASED ON A RECEIVED DIGITAL DATA FORMAT

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/267,393, entitled "Processing Received Digital Data Signals based on a Received Digital Data Format,", filed Nov. 7, 2008, now issued as U.S. Pat. No. 7,831,228, on Nov. 9, 2010, which claims priority pursuant to 35 U.S.C. §120, as a continuation, to the following U.S. Utility Patent Application which is hereby incorporated herein by reference in its entirety and made part of the present U.S. Utility Patent Application for all purposes:

2. U.S. Utility application Ser. No. 11/298,431, entitled "Processing Received Digital Data Signals based on a Received Digital Data Format,", filed Dec. 9, 2005, now issued as U.S. Pat. No. 7,463,871 on Dec. 9, 2008.

BACKGROUND

1. Technical Field

The present invention relates to wireless communications and, more particularly, to processing received digital data signals.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services ("AMPS"), digital AMPS, global system for mobile communications ("GSM"), code division multiple access ("CDMA"), local multi-point distribution systems ("LMDS"), multi-channel-multi-point distribution systems ("MMDS"), and/or variations thereof.

Depending on the type of wireless communication system, a wireless communication device, such as a cellular telephone, two-way radio, personal digital assistant ("PDA"), personal computer ("PC"), laptop computer, home entertainment equipment, etc., communicates directly or indirectly with other wireless communication devices. For direct communications (also known as point-to-point communications), the participating wireless communication devices tune their receivers and transmitters to the same channel or channels (for example, one of a plurality of radio frequency ("RF") carriers of the wireless communication system) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via a public switch telephone network ("PSTN"), via the Internet, and/or via some other wide area network.

Each wireless communication device includes a built-in radio transceiver (that is, receiver and transmitter) or is coupled to an associated radio transceiver (for example, a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data processing and/or demodulation stages are implemented on a baseband processor chip, while the intermediate frequency ("IF") stages and power amplifier stage are implemented on a separate radio processor chip. Also, radio processor chips are available that may utilize digital data interfaces that comply with interface various interface specifications. Therefore, interfaces for the data processing and/or demodulation stages of the baseband processor chip are particularly adapted to specific radio chip interfaces and data formats.

A problem that results is that in various radio processor chips there are varying data formats that are being implemented thereby rendering the received digital data signal format unusable digital data. What is needed, therefore, is a baseband processor with the capability to have several logic structures to accommodate the variety of data formats.

SUMMARY

The present invention is directed to apparatus and methods of operation that are further described in the following Brief Description of the Drawings, the Detailed Description of the Drawings, and the Claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 2 is a schematic block diagram illustrating a wireless communication host device and an associated radio;

DETAILED DESCRIPTION OF THE DRAWINGS

Figure 1:
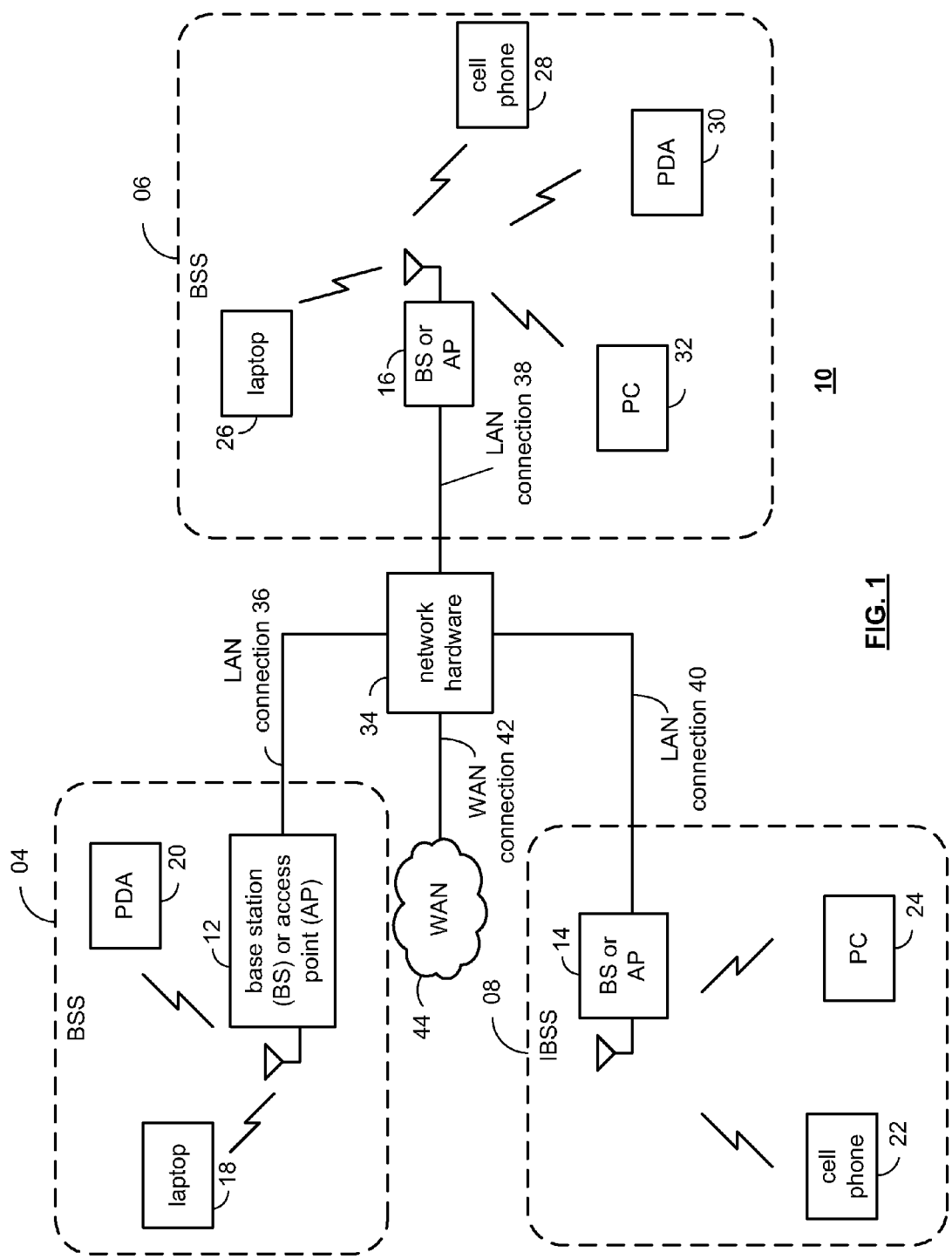
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points ("APs") 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-10.

The base stations or APs 12-16 are operably coupled to the network hardware component 34 via local area network ("LAN") connections 36, 38 and 40. The network hardware component 34, which may be a router, switch, bridge, modem, system controller, etc., provides a wide area network ("WAN") connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (that is, point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (for example, inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver ("Tx/Rx") switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (for example, IEEE 802.11(a), IEEE 802.11b, Bluetooth, etc.) to produce digital transmission formatted data 96. Depending on the RF front-end used, the digital transmission formatted data 96 may be a digital baseband signal (such as provided by direct conversion and/or zero IF front-ends) or a digital very low IF ("VLIF") signal, where the VLIF signal is typically in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
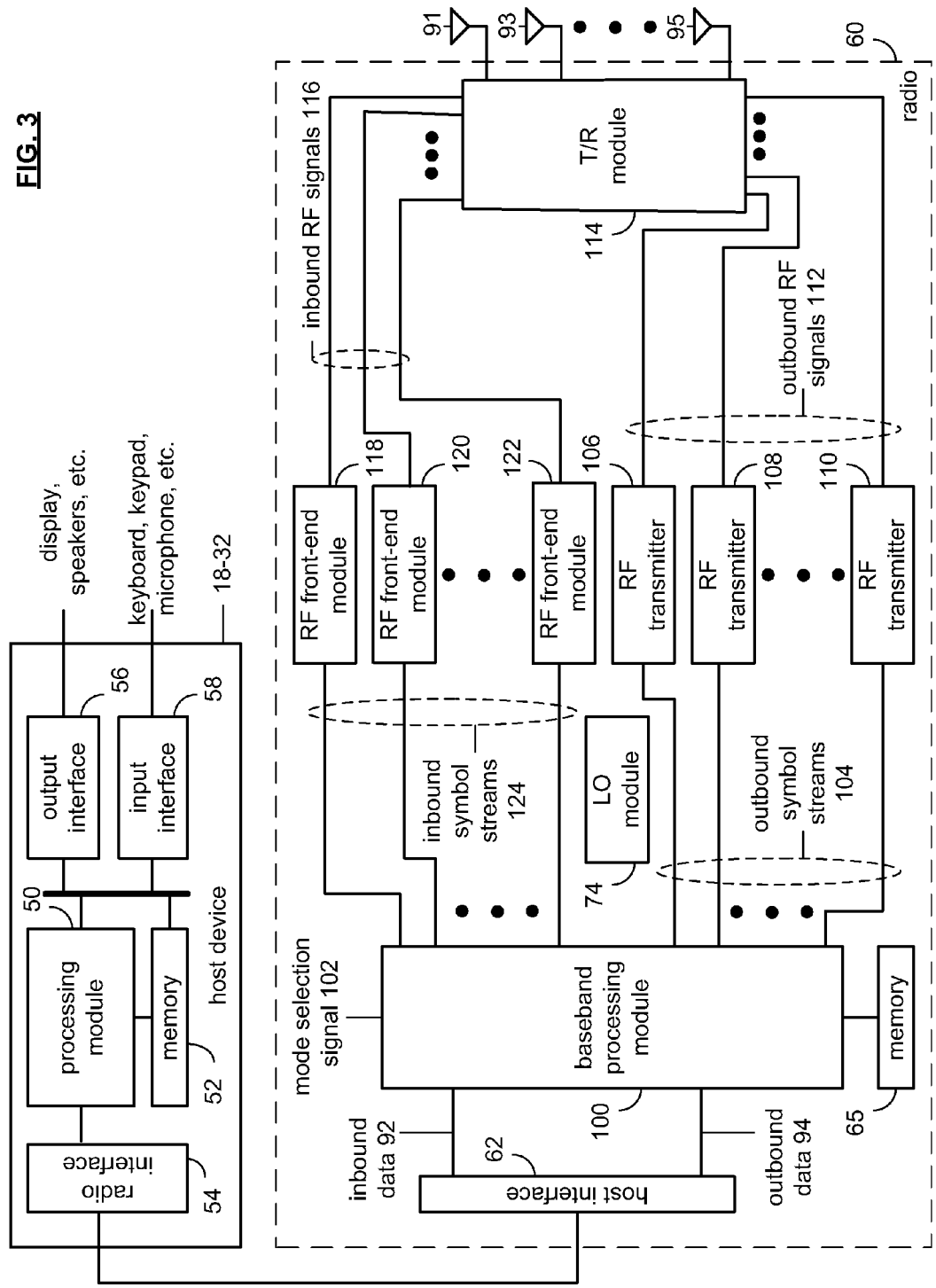
FIG. 3 is a schematic block diagram illustrating a wireless communication device that includes a host device and an associated radio.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (for example, inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive ("T/R") module 114, a plurality of antennas 91-95, a plurality of RF front-ends 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF front-ends 118-122. The RF front-ends 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
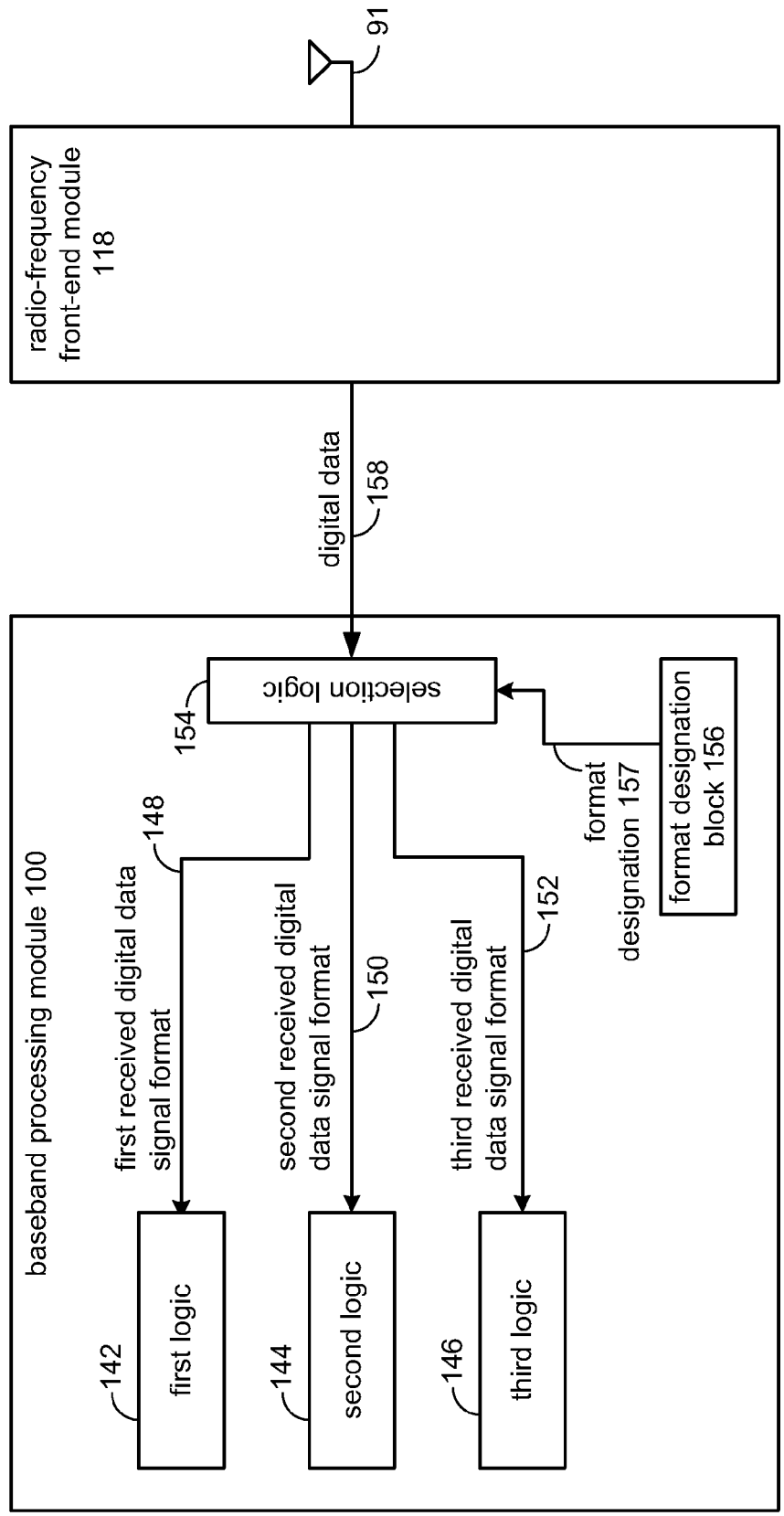
FIG. 4 is a functional block diagram of an integrated circuit receiver portion of a radio transceiver in accordance with the present invention.

FIG. 4 is a functional block diagram of an integrated circuit receiver portion of the radio transceiver 60, which includes a baseband processing module 100 and a radio frequency ("RF") front-end module 118. The baseband processing module 100 includes a first logic 142, a second logic 144, a third logic 146, a selection logic 154, and a format designation block 156.

The RF front-end module 118 receives, via the antenna 91, a continuous waveform signal. As should be readily appreciated by one of ordinary skill in the art, the RF front-end module 118 includes signal processing components for processing the continuous waveform signal to produce digital data 158. The digital data 158, for example, may be provided as one of the streams of inbound symbol streams 124 (see FIG. 3), or as digital reception formatted data 90 (see FIG. 2).

The RF front-end module 118 may provide a variety of predetermined formats for the digital data 158, which the baseband processing module 100 may be selectively configured to process. Examples of digital data formats are baseband digital data signal formats, intermediate frequency (IF) digital data formats (including VLIF formats), digital data formats defined under interface specifications (such as the Digital BB/RF ("DigRF") Interface specification), and/or a combination thereof.

Generally, baseband and/or IF front-end architectures are used in ultra compact, low-power, and low-cost wireless application solutions. When implemented successfully, direct conversion front-ends provide a greater compact realization. Each of these architectures has different design considerations.

In the case of baseband front-ends, the desired signal is directly down-converted to baseband eliminating the multiple IF stages associated with super heterodyne front-ends (that is, VLIF front-ends), as well as reducing front-end circuit complexity and cost. In baseband front-ends, higher-frequency components of the output can be easily removed by active or passive low-pass filtering in the baseband. But the presence of DC offsets and second- and third-order intermodulations may cause difficulty in separating the down-converted output from the extraneous signals. In IF front-ends, DC offset is less of a consideration because the it is generally situated around DC frequencies, and has a very small bandwidth (for example, less than 1 kHz). But with modern communication capabilities and the capabilities of "DC-free" modulation schemes, numerous of the DC offset problems are not largely prohibitive for implementation of baseband front-ends.

An IF front-end generally combines the advantages of IF and direct conversion receivers. In the IF, or heterodyne, front-end approach, DC offsets and intermodulation may be eliminated through capacitive coupling. Nevertheless, a design consideration of IF front-end architectures is the requirement of matching accuracy between components, the phase error introduced by the quadrature oscillator, etc.

The format designation block 156 indicates to the baseband processing module 100, via the selection logic 154, the format of the digital data 158. The format designation block 156 may be provided as a switch designation, a register, and/or an input from the RF front-end module 118. Based upon the output of the format designation block 156, the selection logic 154 is operable to select between the first logic 142, the second logic 144, and the third logic 146 for processing the digital data 158 through the wireless interface provided by the RF front-end module 118 and the antenna 91.

In operation, when the format designation block 156 designates a first format, the selection logic 154 provides a first level of digital filtering, via the first logic 142, for the first received digital data signal format 148. When the format designation block 156 designates a second received digital data signal format 150, the selection logic 154 provides a first level of digital filtering and derotation, via the second logic 144, for the second received digital data signal format 150. When the format designation block 156 designates a third format, the selection logic 154 provides a second level of digital filtering, via the third logic 146, for the third received digital data signal format 152. The second level of digital filtering is reduced in comparison to the first level of digital filtering.

Figure 5:
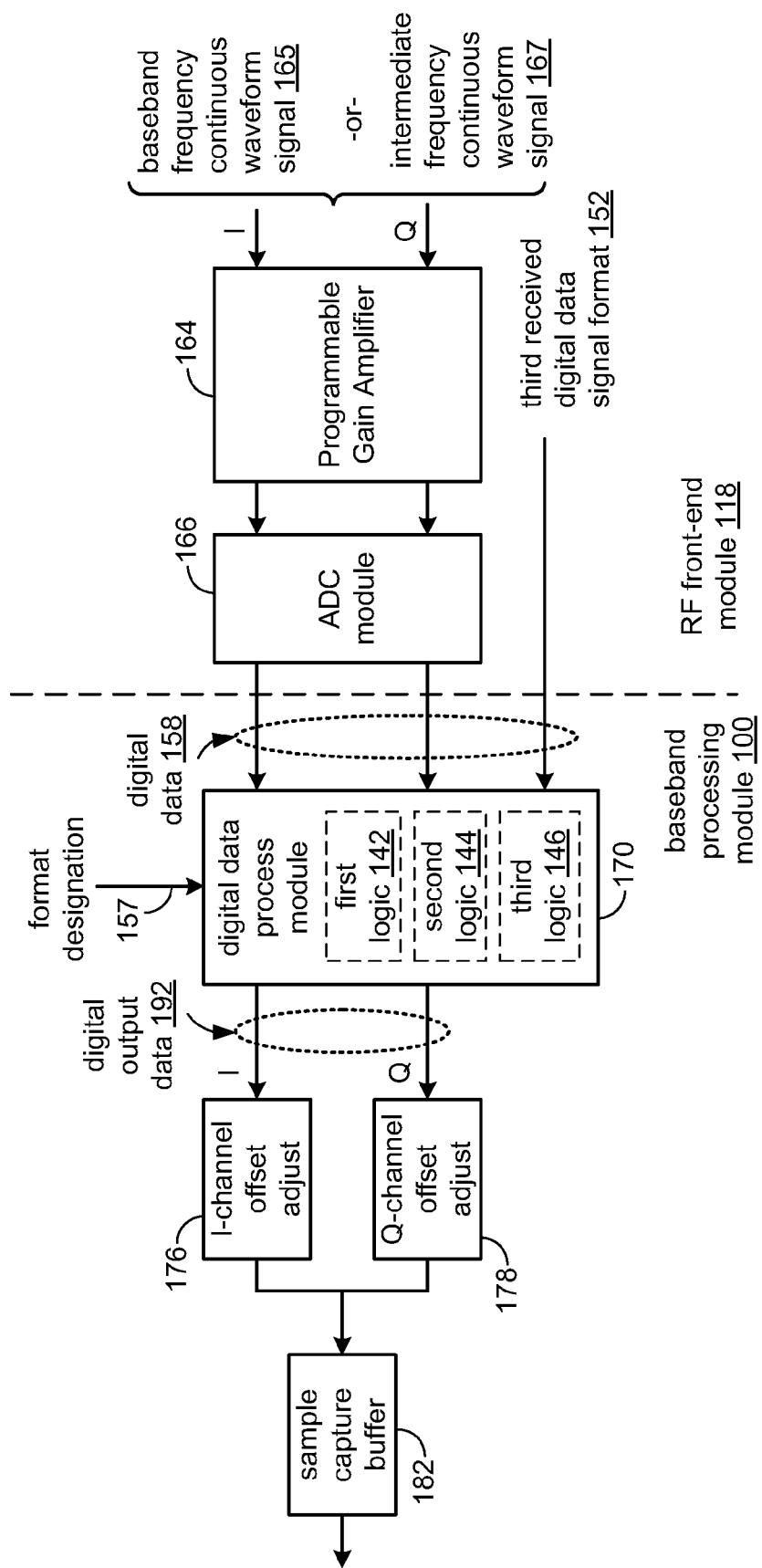
FIG. 5 is a schematic block diagram of a digital data processing module for a baseband processing module in accordance with the present invention.

FIG. 5 is a schematic block diagram of a baseband processing module 100 and RF front-end module 118. The baseband processing module 100 includes a digital data process module 170, an I-channel offset adjust 176, a Q-channel offset adjust 178, and a sample capture buffer 182. In the shown embodiment of the invention, the RF front-end module 118 includes a Programmable Gain Amplifier ("PGA") module 164 and an analog-to-digital converter ("ADC") module 166.

The PGA module 164 receives a baseband frequency continuous waveform signal 165 or an IF continuous waveform signal 167 in a quadrature signal format having an in-phase (I) portion and a quadrature (Q) portion. The PGA module 164 amplifies the baseband frequency continuous waveform signal 165 or an IF continuous waveform signal 167 and provides the amplified signal to an analog-to-digital converter module 166. The analog-to-digital converter module 166 operates to convert the amplified signal from the PGA module 164 to a digital signal as digital data 158. As should be appreciated by one of ordinary skill in art, the RF front-end module 118 and/or the baseband processing module 100 may implement the ADC module 166 and/or the PGA module 164 as desired in a receiver architecture for the radio 60. For the purposes of the present embodiment, the ADC module 166 and the PGA module 164 are implemented in the RF front-end module 118.

The digital data process module 170 is operable to receive a variety of digital data formats provided by the RF front-end module 118. The digital data formats may be based on zero IF architectures (that is, baseband), IF architectures (including VLIF), or interface specification (for example digRF) architectures. Accordingly, the data provided by each of these architectures call for specific digital signal processing to successfully retrieve the data contained within.

The digital data process module 170, which is discussed in detail with reference to FIGS. 6 through 10, receives the digital data 158, which may be in a first received digital data signal format 148, a second received digital data signal format 150, or a third received digital data signal format 152. For example, the first being a baseband (or zero IF) format; the second being a IF (or VLIF) format, and the third based upon an interface specification format (such as the digRF specification). Based upon the received digital data signal format provided by the RF front-end module 118, the selection logic 154 is operable to select the first logic 142, second logic 144, and third logic 146, based upon a format designation block 156.

The I-channel offset adjust 176 and the Q-channel offset adjust 178 compensate for offsets in the I portion and the Q portion of the digital output data 192. The sample capture buffer 182 receives the digital output data 192 and initiates processing of the signal data contents. As one of ordinary skill in the art may appreciate, the data from the sample capture buffer 182 may be further processed and provided to the host interface 62 (see FIGS. 2 and 3).

Figure 6:
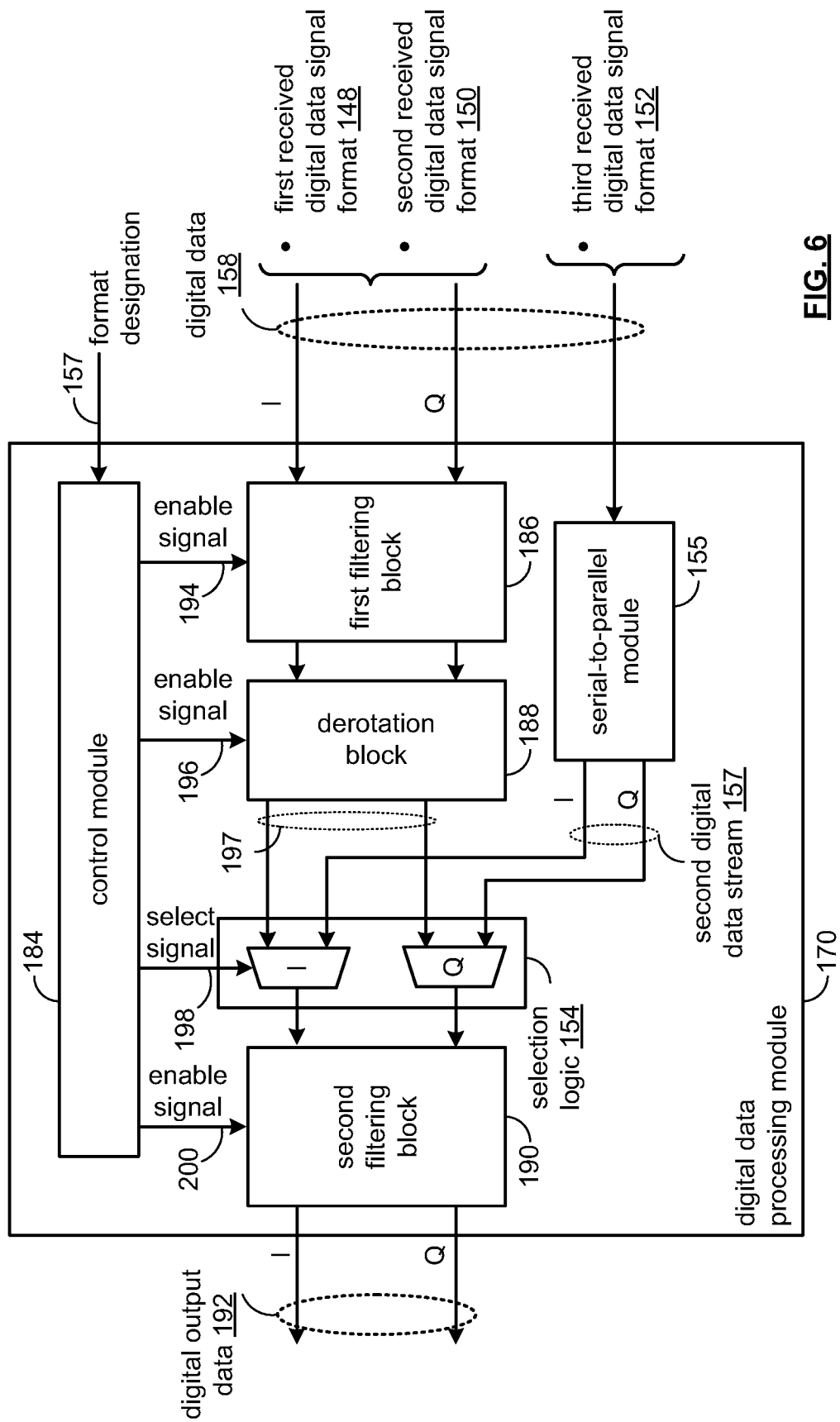
FIG. 6 is a schematic block diagram of the digital data processing module of the baseband processing module of FIG. 5.

FIG. 6 is a schematic block diagram of a digital data processing module 170. The digital data processing module 170 includes a control module 184, a first filtering block 186, a derotation block 188, a selection logic 154, a second filtering block 190, and a serial-to-parallel module 155.

The RF front-end module 118 provides the first received digital signal format 148, the second received digital data signal format 150, and the third received digital data signal format 152. For example, the first received digital signal format may be a baseband or conventional RF signal format. The second received digital signal format may be an intermediate frequency (or VLIF) digital signal format. The third received digital data signal format 152 may be consistent with a digital interface format specification (for example, the Digital BB/RF ("DigRF") interface specification, and/or other specification designating an interface between baseband and RF integrated circuits).

Based upon the format designation block 156, which is discussed in detail with reference to FIGS. 7, 8, and 9, the control module 184 selectively enables the first filtering block 186 with an enable signal 194, the derotation block 188 with an enable signal 196, and/or the second filtering block 190 with an enable signal 200. Also, the control module 184 selectively produces the input to the second filtering block 190 and via the selection logic 154 through a select signal 198.

The control module 184 receives the format designation 157, and accordingly configures the signal processing logic of the digital data processing module 170 via the enable signals 194, 196, and 200. Also, as part of the configuration, the control module 184 provides a selector signal 198 to the selection logic 154, to selected the data signal format provided to the second filtering block 190.

The serial-to-parallel module 155 serially receives the third received digital data signal format 152. That is, the I portion and the Q portion of the quadrature signal components are interleaved to form the third received digital data signal format 152. The serial-to-parallel module 155 converts the third received digital data signal format 152 to a parallel signal providing separated or discrete I and Q portions of the third received digital data signal format 152. Based on the select signal 198, the selection logic 154 operates to select between the data stream of the first or the second received digital data signal formats 148 and 150, or the third received digital data signal format 152.

The selection logic 154, based on the select signal 198, selects or routes the first digital stream 197 or the second digital data stream 157 to the second filtering block 190. The second filtering block receives digital data from the selection logic 154 and provides it as digital output data 192.

The first filtering block 186 and the second filtering block 190 may be provided as staged digital filtering operations to provide suitable sample rate conversions and/or other digital filtering operations for further processing of the digital output data 192 by the radio 60. For example, the digital filtering operations may be provided by decimation and/or interpolation filter stages (for example, finite impulse response filters ("FIR"), infinite impulse response ("IIR"), cascaded integrator-comb ("CIC"), etc.), as can be readily appreciated by one of ordinary skill in the art. Digital filtering in stages provides certain economies of efficiency in terms of power consumption and speed with respect to the receiver architecture. For example, power savings and increased processing speeds can be realized with multiple filtering stages that reduce the number of taps, and reduce processing requirements, into digital filter stages of a filtering block.

Figure 7:
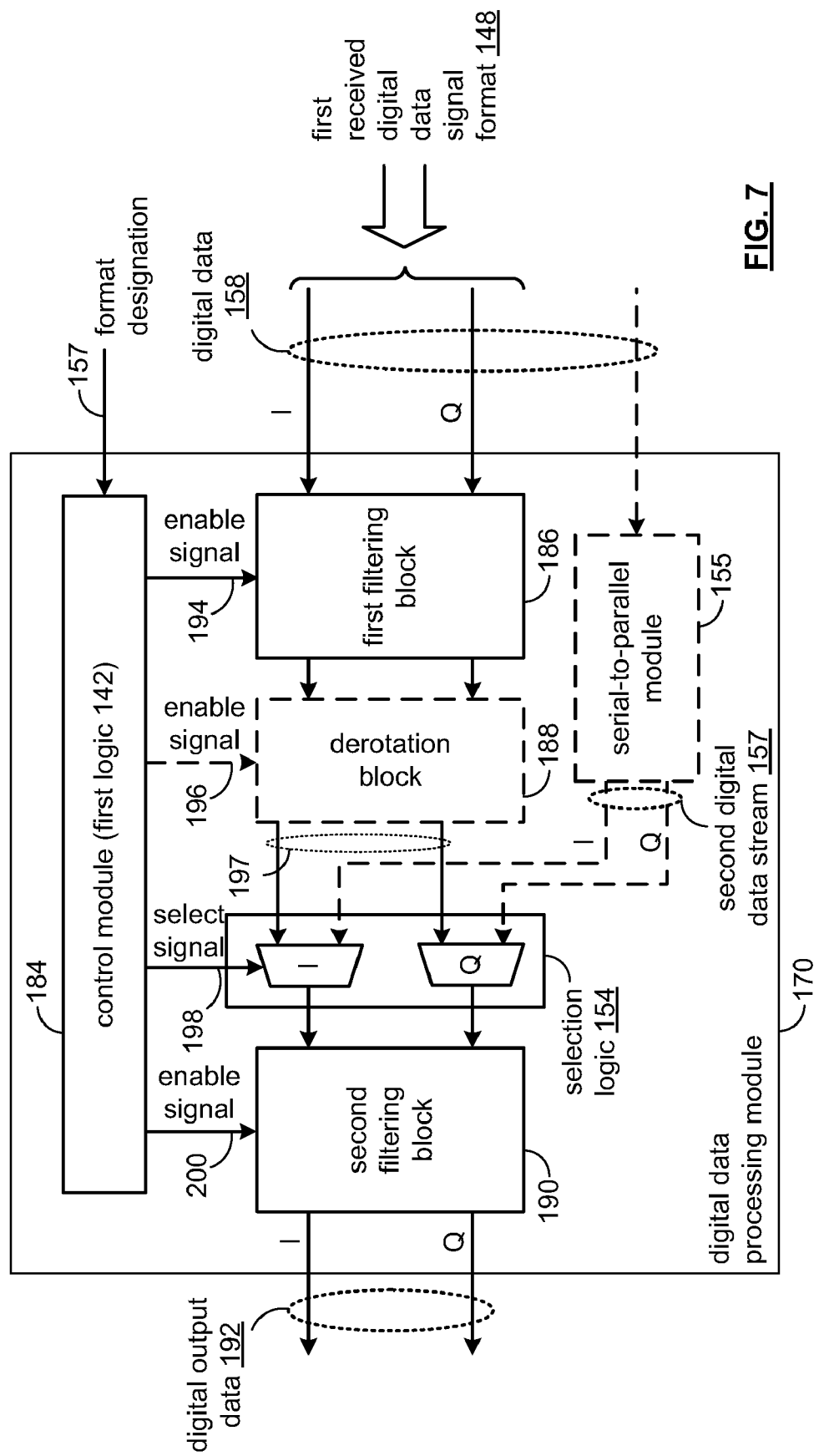
FIG. 7 is a schematic block diagram of a digital data processing module configured for a first logic in accordance with the present invention.

FIG. 7 is a schematic block diagram of the digital data processing module 170 configured to provide first logic 142. The control module 184 receives the format designation block 156, which designates a first received digital data signal format 148 of the digital data 158. Based on the format designation block 156, the control module configures the digital data processing module 170 for the first logic 142. For the example provided, the first receive digital data signal format of the digital data 158 is a baseband format. The dashed lines within FIG. 7 represent disabled components and/or non-operational components of the digital data processing module 170, such as the serial-to-parallel module 155 and the derotation block 188. The first logic 142 selectively enables the first filtering block 186 with the enable signal 194, the second filtering block 190 with the enable signal 200. When not enabled via the enable signal 196, the derotation block 188 passes (for example, via decision logic in firmware) the first filtering block 186 output to the first digital data stream 197, via the select signal 198 to the selection logic 154, to the second filtering block 190. Accordingly, the first logic 142 is operable to provide a first level of digital filtering for the first received digital data signal format 148 by the first filtering block 186 and the second filtering block 190.

Figure 8:
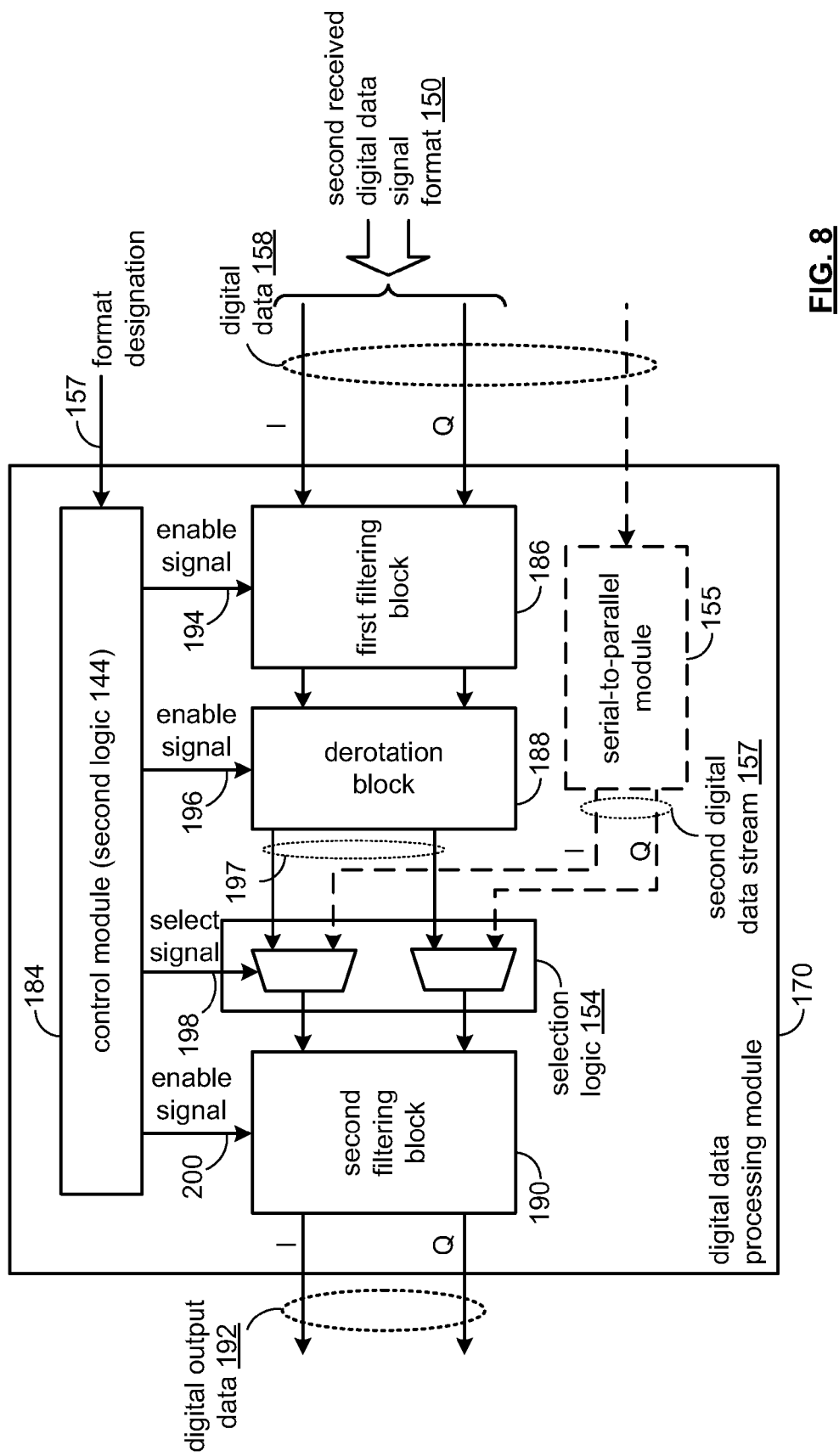
FIG. 8 is a schematic block diagram of a digital data processing module configured for a second logic in accordance with the present invention.

FIG. 8 is a schematic block diagram of the digital data processing module 170 configured to provide second logic 144. The control module 184 receives the format designation block 156, which designates a second received digital data signal format 150 of the digital data 158. Based on the format designation block 156, the control module 184 configures the digital data processing module 170 for the second logic 144. For the example provided, the second received digital data signal format 150 is for an intermediate frequency (IF) format. The dashed lines within FIG. 8 represent disabled and/or non-operational components of the digital data processing module 170, such as the serial-to-parallel module 155.

The second logic 144 selectively enables the first filtering block 186 with the enable signal 194, the second filtering block 190 with the enable signal 200, the derotation block 188 with the enable signal 196, and provides the first digital data stream 197, via the select signal 198 to the selection logic 154, to the second filtering block 190. The second logic 144 is operable to provide a least one filtering block of the first logic, such as the first filtering block 186. Further the second logic 144 includes at least two filtering blocks, such as the first filtering block 186 and the second filtering block 190, in addition to the derotation block 188. The derotation block 188 provides frequency offset compensation of the second receive digital data signal format, which is based on a VLIF signal format. The frequency offset compensation allows the digital processing components of the digital data processing module to operate at a zero-IF (that is, baseband) level, reducing the complexity of the digital data processing module 170. That is, the derotation block 188 compensates the VLIF carrier of the second received data signal format 150 to appear as a baseband digital signal for further signal processing. As one of ordinary skill in the art will appreciate, the compensation may be provided via a CORDIC (COordinate Rotation DIgital Computer) algorithm.

Figure 9:
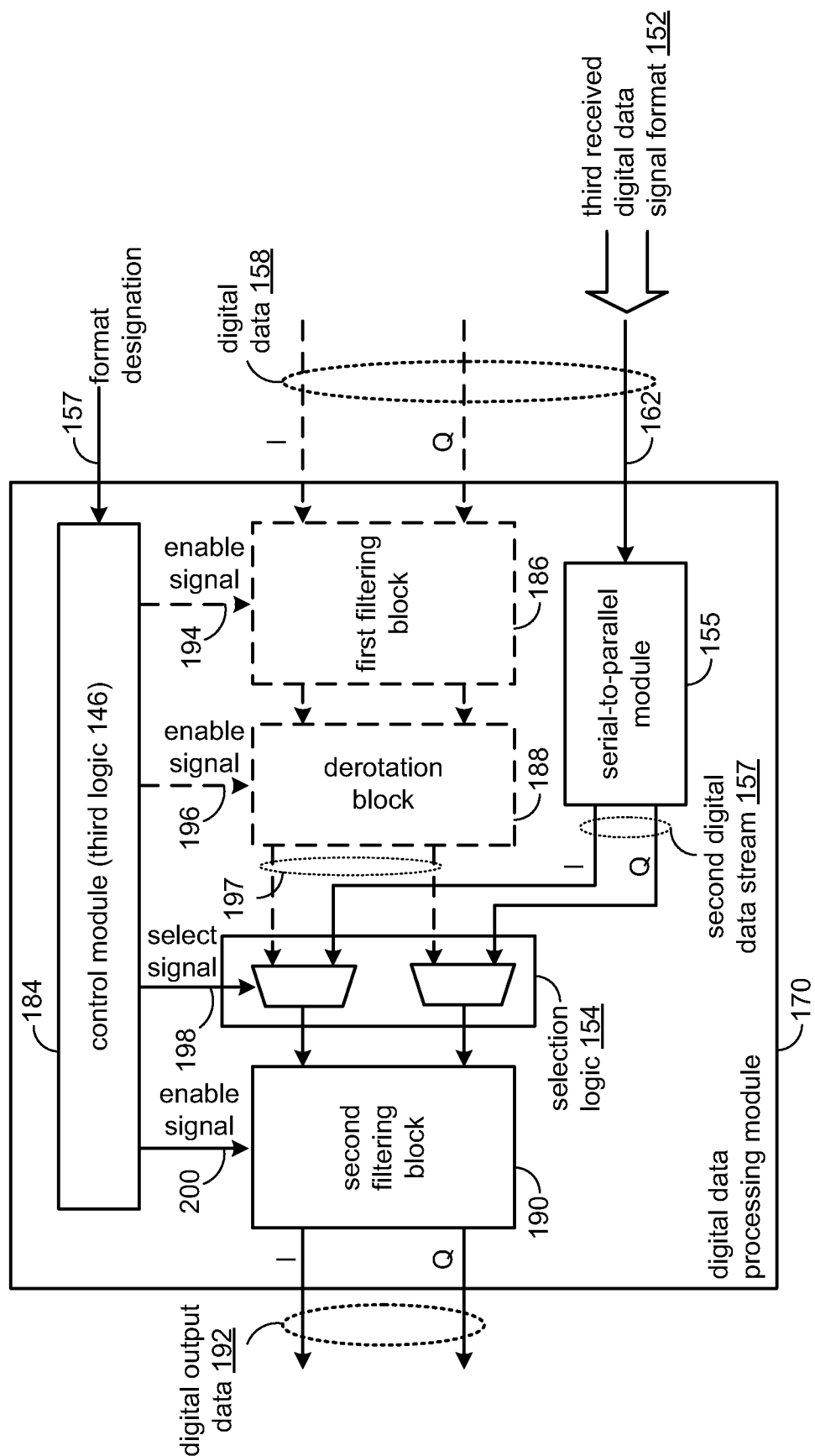
FIG. 9 is a schematic block diagram of a digital data processing module configured for a third logic in accordance with the present invention.

FIG. 9 is a schematic block diagram of the digital data processing module 170 configured to provide third logic 146. The control module 184 receives the format designation block 156, which designates a third received digital signal format 152 of the digital data 158. Based on the format designation block 156, the control module 184 configures the digital data processing module 170 for the third logic 146. The example provided, the third received digital data signal format 152 is for digital data provided in accordance to an interface specification (such as, digRF, etc.). Under the example of the digRF specification, the third received digital data signal format 152 is a serial signal that includes an interleaved quadrature I/Q portions. The serial-to-parallel module 155 converts the third received digital data signal format 152 to a parallel signal providing separated and/or discrete I and Q portions as the second digital data stream 157. The dashed lines within FIG. 9 represent disabled and/or non-operational components of the digital data processing module 170, such as the first filtering block 186 and the derotation block 196. The third logic 146 selectively enables the second filtering block 190, which is provided the second digital data stream, via the select signal 198 to the selection logic 154. The third logic 146 is operable to provide a second level of digital filtering for the third received digital data signal format 152. The second level of digital filtering is reduced in comparison to the first level of digital filtering associated with the first logic 142 and/or the second logic 144. That is, the first level of digital filtering includes filtering via the first filtering block 186 and the second filtering block 190. In comparison, the second level of filtering includes filtering by the second filtering block 190, in effect, bypassing the first filtering block 186. Such reduction may also be considered as a reduction in processing overhead to the third received digital data signal format 152. Further, the third logic 146 includes the serial-to-parallel module 155, which is operably disposed to produce the parallel digital data to the second filtering block 190 by way of the selection logic 154.

Figure 10:
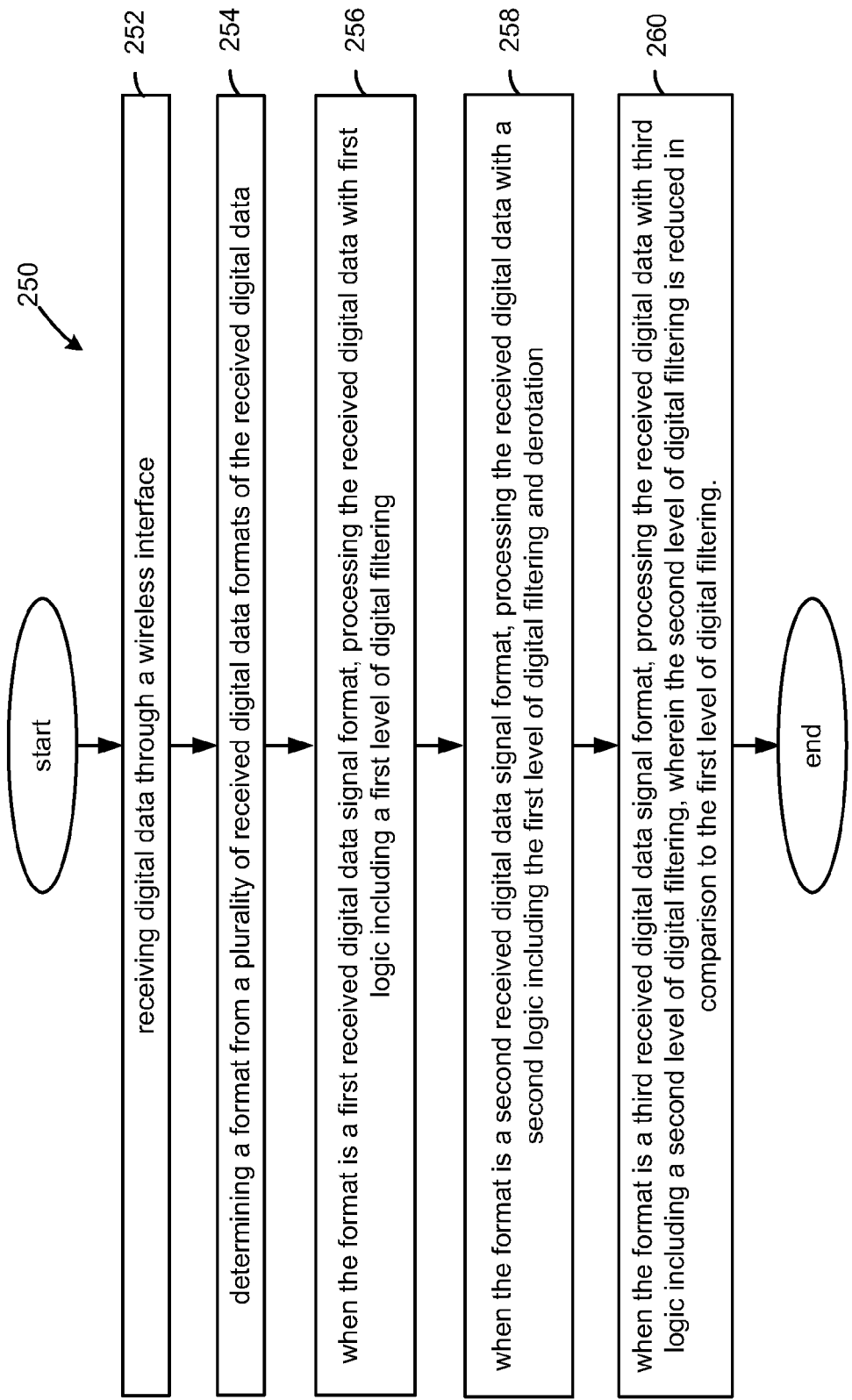
FIG. 10 is a flow chart illustrating a method for processing digital data according to a received digital data format.

FIG. 10 is a flow chart illustrating a method 250 for processing digital data according to a received digital data format. At step 252, digital data is received through a wireless interface. With the received digital data at step 254, a format is determined from a plurality of received digital data formats. At step 256, when the format is a first received digital data signal format, the received digital data is processed with first logic that includes a first level of digital filtering. At step 258, when the format is a second received digital data signal format, the received digital data is processed with a second logic including the first level of digital filtering and derotation for frequency offset compensation. At step 260, when the format is a third received digital data signal format, the method 250 processes the received digital data with third logic that includes a second level of digital filtering. The second level of digital filtering is reduced in comparison to the first level of digital filtering.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. An integrated circuit radio receiver comprises:
radio frequency ("RF") front-end circuitry operable to receive a wireless signal and to produce digital data;
a baseband processor operable to process the digital data, wherein the baseband processor is operable to produce a format designation based upon the digital data, the baseband processor includes:
a plurality of digital filtering logic wherein each of the digital filtering logic includes a level of digital filtering; and
logic operable to select between the each of the digital filtering logic of the plurality of digital filtering logic based upon the format designation, and to process the digital data with the level of digital filtering of the selected digital filtering logic.

2. The integrated circuit radio receiver of claim 1, wherein the plurality of digital filtering logic includes:
first logic operable to provide a first level of digital filtering for a first received digital data signal format;
second logic operable to provide the first level of digital filtering and derotation for a second received digital data signal format; and
third logic operable to provide a second level of digital filtering for a third received digital data signal format wherein the second level of digital filtering is reduced in comparison to the first level of digital filtering.

3. The integrated circuit radio receiver of claim 2 wherein the first logic comprises at least two filtering blocks.

4. The integrated circuit radio receiver of claim 3 wherein the second logic comprises the at least two filtering blocks of the first logic in addition to a derotation block.

5. The integrated circuit radio receiver of claim 2 wherein the second logic comprises at least one filtering block of the first logic.

6. The integrated circuit radio receiver of claim 2 wherein the third logic further includes a serial-to-parallel block operably disposed to receive serial digital data and operable to produce parallel digital data to the filtering block of the third logic.

7. The integrated circuit radio receiver of claim 6 wherein the serial-to-parallel block is operably disposed to produce the parallel digital data to the filtering block of the third logic by way of a multiplexer.

8. The integrated circuit radio receiver of claim 2 further including state machine control logic for generating control signals for each filtering block of the first and second logics and for a derotation block.

9. The integrated circuit radio receiver of claim 2 wherein the first received digital data signal format is produced by an analog-to-digital converter that is operably disposed to receive a baseband frequency continuous waveform signal.

10. The integrated circuit radio receiver of claim 2 wherein the first received digital data signal format is produced by an analog-to-digital converter that is operably disposed to receive a very low intermediate frequency continuous waveform signal.

11. The integrated circuit radio receiver of claim 2 wherein the first received digital data signal format is produced by an analog-to-digital converter that is operably disposed to receive an intermediate frequency continuous waveform signal.

12. The integrated circuit radio receiver of claim 2 wherein the second received digital data signal format is produced by a digital processing block that is operably disposed to receive a continuous waveform signal and further wherein the digital data signal rate is at a higher sample rate than the first received digital data signal format.

13. A baseband processor operable to process digital data received from a wireless interface, the baseband processor comprises:
a plurality of digital filtering logic wherein each digital filtering logic includes a level of digital filtering; and
logic operable to select, based upon a format designation of the digital data, between the each digital filtering logic of the plurality of digital filtering logic, the logic operable to process the digital data with the level of digital filtering of the selected digital filtering logic.

14. The baseband processor of claim 13, wherein the plurality of digital filtering logic includes:
first logic operable to provide a first level of digital filtering for a first received digital data signal format;
second logic operable to provide the first level of digital filtering and derotation for a second received digital data signal format; and
third logic operable to provide a second level of digital filtering for a third received digital data signal format wherein the second level of digital filtering is reduced in comparison to the first level of digital filtering.

15. The baseband processor of claim 14 wherein the first logic comprises at least two filtering blocks.

16. The baseband processor of claim 14 wherein the second logic comprises at least one filtering block of the first logic.

17. The baseband processor of claim 14 wherein the second logic comprises the at least two filtering blocks of the first logic in addition to a derotation block.

18. The baseband processor of claim 14 wherein the third logic further includes a serial-to-parallel block operably disposed to receive serial digital data and operable to produce parallel digital data to the filtering block of the third logic.

19. The baseband processor of claim 18 wherein the serial-to-parallel block operably disposed produces the parallel digital data to the filtering block of the third logic by way of a multiplexer.

20. The baseband processor of claim 14 further including state machine control logic for generating control signals for each filtering block of the first and second logics and for a derotation block.

* * * * *